United States Patent [19]

Meyers et al.

[11] Patent Number: 5,937,159
[45] Date of Patent: Aug. 10, 1999

[54] SECURE COMPUTER SYSTEM

[75] Inventors: William J. Meyers; Marc J. Fraioli, both of Durham; Jon F. Spencer, Raleigh, all of N.C.

[73] Assignee: Data General Corporation, Westboro, Mass.

[21] Appl. No.: 08/829,648

[22] Filed: Mar. 28, 1997

[51] Int. Cl.⁶ .................................................. G06F 11/00
[52] U.S. Cl. ....................................... 395/187.01; 395/186
[58] Field of Search .............................. 395/186, 187.01, 395/188.01, 200.59, 200.3, 200.33, 200.47, 200.49; 380/3, 4, 25

[56] References Cited

U.S. PATENT DOCUMENTS

| | | |
|---|---|---|
| 4,885,749 | 12/1989 | Burger et al. . |
| 4,945,468 | 7/1990 | Carson et al. . |
| 4,984,272 | 1/1991 | McIlory . |
| 5,023,773 | 6/1991 | Baum et al. . |
| 5,032,979 | 7/1991 | Hecht et al. ........................ 395/187.01 |
| 5,321,841 | 6/1994 | East et al. . |
| 5,361,359 | 11/1994 | Tajalli et al. . |
| 5,506,961 | 4/1996 | Carlson et al. . |
| 5,572,673 | 11/1996 | Shurts . |
| 5,594,904 | 1/1997 | Linnermark et al. .............. 395/183.11 |
| 5,699,513 | 12/1997 | Feigen et al. ...................... 395/187.01 |
| 5,781,550 | 7/1998 | Templin et al. .................... 395/187.01 |

*Primary Examiner*—Robert W. Beausoliel, Jr.
*Assistant Examiner*—Pierre E. Elisca
*Attorney, Agent, or Firm*—Donald A. Lewine; Robert L. Dulaney

[57] ABSTRACT

A system and method for controlling the access of users to a trusted computer system using an authentication and authorization database, containing information used to authenticate human users and information establishing what each user can do, and a number of software processes, including session initiation, authorization, credentials and database management daemons. The software processes are implemented in an independent fashion to prevent any process from performing an operation that would affect another process in an unauthorized way.

25 Claims, 11 Drawing Sheets

Not Trusted (PRIOR ART)

Trusted (PRIOR ART)

(Preferred Embodiment)

```
DG/UX Trusted Path

DG/UX Trusted Path Menu 1 passwd       Set Password
    2 SIGINT       Send keyboard interrupt signal
    3 logout       Terminate session
    4 status       Display session status
    5 subsessions -> Create, list, and choose subsessions Enter a number, a name, ? or <number>? for help, <NL> to
redisplay menu, or q to quit:
```

FIG. 6A

```
Subsession Control 1 newsession ... Create new subsession with different mac label
    2 assume ...     Create new subsession for an administrative role
    3 su ...         Create new subsession as another user
    4 choose ...     Choose a subsession to be active
    5 list           List subsessions Enter a number, a name, ? or <number>? for help, <NL> to
redisplay menu, ^ to return to previous menu, or q to quit:
```

FIG. 6B

| Service | Description |
| --- | --- |
| login | Identifies the user at the beginning of a terminal session. |
| ftp | Transfers files to and from a remote network site. |
| telnet | Logs in to another host using the TELNET protocol. |
| crontab | Runs specified jobs at specified times (delayed execution). |
| at | Reads commands from the command line and runs them at another time (delayed execution). |
| su | Enables the user to assume the identity and part of the security credentials of another user. |
| assume | Enables the user to assume an administrative role. |
| newsession | Enables the user to create a new subsession. |

FIG. 8

```
DG/UX Trusted Path
Press the newline key to continue login
password:
```

FIG. 9

SECURE COMPUTER SYSTEM

CROSS REFERENCE TO RELATED APPLICATIONS

There are no related applications.

1. Background—Field of Invention

This invention is related to the field of data processing. In particular, the present invention relates to an improved computer system that meets the C2 or greater class of trust as defined by the *Department of Defense Trusted Computer System Evaluation Criteria* (TCSEC) publication DoD 5200.28STD December 1985. TCSEC is a publication of the National Computer Security Center (NCSC).

2. Background—Description of Prior Art

TCSEC defines secure computer systems as follows: "In general, secure systems will control, through use of specific security features, access to information such that only properly authorized individuals, or processes operating on their behalf, will have access to read, write, create, or delete information."

TCSEC's fundamental security requirements for level C2 and above are:

(1) Security Policy—"There must be an explicit and well-defined security policy enforced by the system."

(2) Identification—"Individual subjects must be identified."

(3) Accountability—"Audit information must be selectively kept and protected so that actions affecting security can be traced to the responsible party."

(4) Assurance—"The computer system must contain hardware/software mechanisms that can be independently evaluated to provide sufficient assurance that the system enforces requirements 1 through 3."

(5) Continuous Protection—"The trusted mechanisms that enforce these basic requirements must be continuously protected against tampering and/or unauthorized changes."

FIG. 1 shows a prior art non-trusted computer system (Hardware not shown). Operating system 103 is shown to be separately interactive with User Program A 101 and User Program B 102. The operating system 103 in combination with hardware protection mechanisms, such as page tables, (not shown) is supposed to protect one user program 101 from another user program 102 and to prevent a user from being able to access or modify protected information. If there is a design flaw or coding error in the software, system security may be compromised. This is a severe problem.

The Federal Government has established criteria for evaluating and testing a system to make sure that there are no security related design flaws or coding errors. After a system has been evaluated and tested, if it passes the test, it can be trusted. FIG. 2 shows an example of a prior art trusted system (hardware not shown). FIG. 2 shows operating system 203 interacting with login program 201 and ftp daemon 202. The arrows (unnumbered) showing bi-directional communication between the operating system 203 and the login program 201 and between the operating system 203 and the ftp daemon 202 are intended to show that the login program 201 is isolated from the ftp daemon 202 by the operating system 203. The ftp daemon 202 is a program used to grant file access to remote users. The login program 201 is used to allow local users to access the computer system. The system of FIG. 1 differs from the system of FIG. 2 in that the system of FIG. 2 has been tested and shown to be worthy of trust. In all other respects, FIG. 2 is an ordinary computer system and has not been engineered to make it easy to maintain its trust rating. U.S. Pat. No. 4,885,789 shows a similar prior art trusted system in its FIG. 1. FIG. 3 of U.S. Pat. No. 4,945,468 shows another example of a prior art trusted system. In these systems there is little internal protection within the components of the trusted system. If any component is altered the required level of assurance must be proved.

In FIG. 2 all of the functions for gaining access to the system are located in the login program 201. It must access the password file, talk to the user's terminal and perform other tasks. The ftp daemon 202 also must access the password file, talk to the network and do many other tasks. If someone wants to change the format of the password file or add an additional user authentication feature, many places in the system must be modified and a great deal of retesting is required. This is a shortcoming of the prior art secure systems.

The prior art systems all suffered from the limitations noted. In addition the prior art systems were limited by the time and expense of maintaining the assurance of trust after a change was made. By contrast, the present invention has solved certain prior art problems and overcome certain prior art limitations. For example: The present invention is directed to, at least, making TCSEC requirement of assurance much easier and less expensive to achieve. The present invention, among other things, reduces the cost of assuring that a computer system operates at a given level of trust after a component is altered. Other advantage are also obtainable by use of the present invention.

OBJECTS AND ADVANTAGES

It is a broad objective of the present invention to provide an improved computer system.

It is another broad objective of the present invention to provide a trusted computer system that can be modified and retested at relatively low cost.

It is a further objective of the present invention to allow the customer of the computer system to add customer written authentication daemons and session initiators.

BRIEF DESCRIPTION OF THE DRAWINGS

FIG. 6A shows the trusted path banner and menu.

FIG. 6B show the subsession control menu.

FIG. 8 is a table showing the various session initiators and the types of functions they initiate.

FIG. 9 shows the trusted path banner.

SUMMARY

Figure 1:
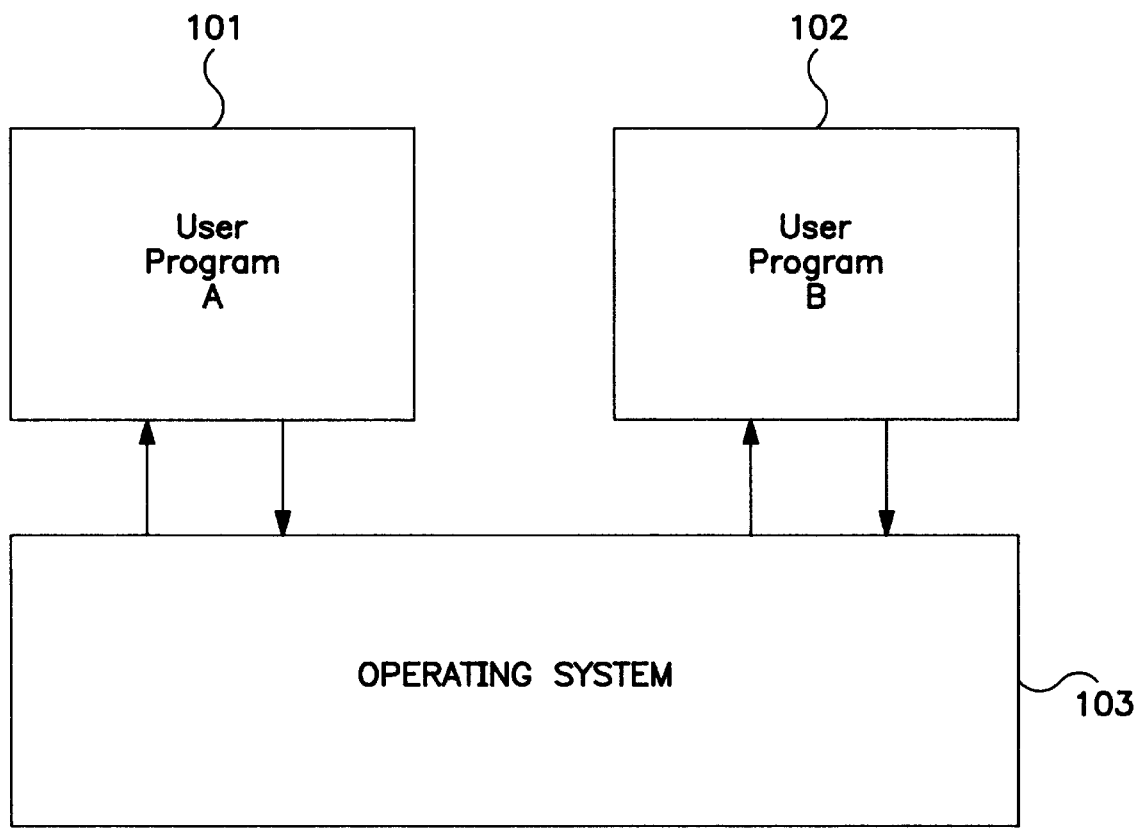
FIG. 1 shows a prior art non-trusted system.
Figure 2:
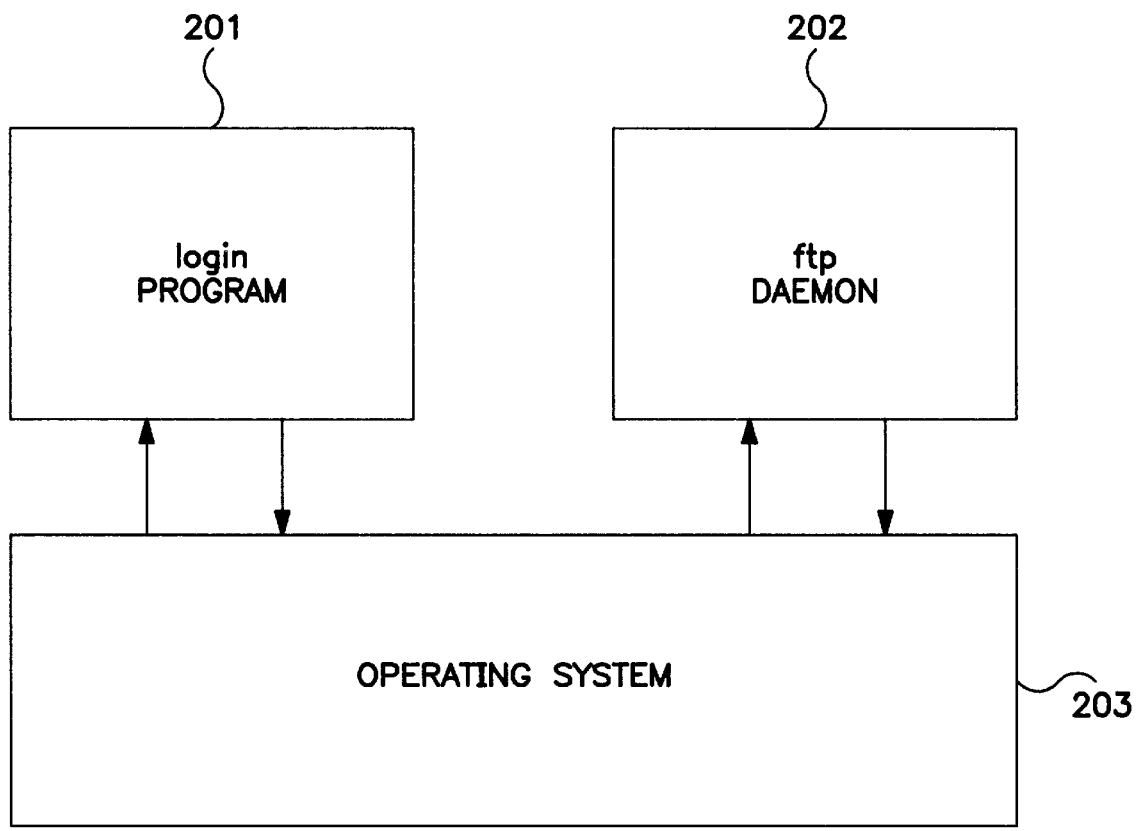
FIG. 2 shows a prior art trusted system.

The present invention uses computer hardware controlled by an improved secure operating system to establish a high level of confidence or trust that the system is, in fact, secure. There is an authentication and authorization database which holds both information used to authenticate human users (make them prove who they are) and authorization data establishing what they can do. There are a number of user-mode software processes. The security features of the operating system prevents any process from performing any operation which would affect another process in an unauthorized way. One of these processes, the A&A (authentication and authorization) Daemon, is responsible for accessing the authentication and authorization database. The operating system thus prevents any process except for the A&A Daemon from accessing the database. Since the A&A Daemon is tested and trustworthy, the database is protected from unauthorized access.

In addition to the A&A Daemon, there are other processes. One of these processes is known as the Credentials Daemon (CD). The CD is responsible for deciding:

(a) Is it authorized to initiate a session? and (b) If authorized, then what credentials and other attributes are appropriate for the requested session?

Other programs are known as Session Initiators (SI). For example, the login program lets a user start a sign on to the computer and the ftp program lets a user access files from a remote location. In the present invention an SI determines the parameters and constraints for a session. It then sends a message to the CD asking if the session is authorized. If the session is authorized, the CD sends a set of session credentials to the SI and the SI initiates the session.

In some cases, the SI already has a set of credentials. For example, the su Unix program would have a set of credentials when the user invokes it. The SI merges the credentials it got from the CD with the existing credentials to form an effective set of credentials. This operation is called a credentials merge.

In some cases, the CD does not have enough information to determine if a user is authentic (i.e. is the person who he or she claims to be). In this case, there is another process called an Authentication Daemon (AD). The AD knows how to authenticate users based on information stored in the A&A database. The CD requests information from the A&A database daemon and sends it to the AD. The AD then authenticates the user and sends a message back to the CD indicating the success or failure of the authentication step.

Sometimes, the AD needs to get information from the user, such as a password. The AD, however, does not have trusted access to the user's keyboard. So the AD sends a message to the CD which in turn, sends a message to the SI which finally is able to accept input from the keyboard.

In some cases, the AD needs to display some information to the user, for example, a particular challenge. In this case the AD sends the information to be displayed in the message described in the previous paragraph.

Sometimes the AD has access to special hardware, for example, a smart card reader or a finger print reader. To enable the AD to use this hardware properly, the CD includes the users location in the message to the AD.

Sometimes, more than one AD is required to authenticate a user. In that case the CD calls each AD, in turn, and authenticates the user. For example, one AD might ask a user for a password and another AD might check a smart card or other security token. After all of the ADs report back to the CD, the CD makes a second pass and informs each AD of the results of the authentication process.

Sometimes an AD will let a user modify the authentication data, for example, change his password. In other cases an AD may require a user to modify his authentication data, for example, the security policy might require that a user change his password at least once a month. This is done in the second pass after the user has been completely authenticated. In the prior art, single pass scheme, a user might be able to change his password even if he did not have the smart card to enable him to fully authenticate himself.

The AD may keep some authentication data in its own private database or it may pass the data back to the CD and have the CD request the A&A database daemon to store the data in the A&A database.

If an attacker is trying to break into the trusted computer system, it is important to stop the attack before causing any damage and without causing legitimate users to be unduly denied service. The A&A database contains authentication records containing a user identity, a authentication scheme for the user, and an action the user is authorized to perform. If the user is authorized, but fails to be authenticated after a predetermined number of attempts, the authentication record for that user and service may be suspended. If the user fails to be authorized after a predetermined number of attempts, the user's account is suspended. If the requester does not even have a valid account, the port he is using to access the system is suspended after a predetermined number of attempts. The objective is to suspend the minimum amount of access and still thwart the attack.

When an attacker is trying to break into the trusted system, it is important to give the attacker as little to work with as possible. For example, if the system said "Invalid Username" before asking for a password, the attacker would know he had a valid username the first time he was asked for a password. In order to implement this, there is a base authentication procedure in the A&A database which goes through all of the normal authentication steps, including calling one or more ADs, but the CD refuses to authenticate the requester. So an attacker must go through all of the steps of authentication before learning that a request was denied and then he is not told which step failed.

The authentication daemon can perform a number of functions upon request:

(a) It can check to see if a user is authentic. The particular authentication data used and the means used to authenticate the user depend on the particular AD.

(b) It can change the authentication data.

(c) It can allocate some space to hold authentication data.

(d) It can store an initial set of data.

(e) It can print the data or convert it to some other human readable form, for example, ASCII text.

(f) It can verify that the data is in the correct format and has not been corrupted. It can also check the age of the authentication record.

A further feature of our invention includes a utility which requests each record in the A&A database from the A&A database daemon and presents authentication records to the correct AD for verification. Thus, a periodic check on the integrity of all of the information stored in the A&A database can be performed. In particular, some records may no longer be valid because the data has not been changed recently enough.

Preferred Embodiment

Figure 3:
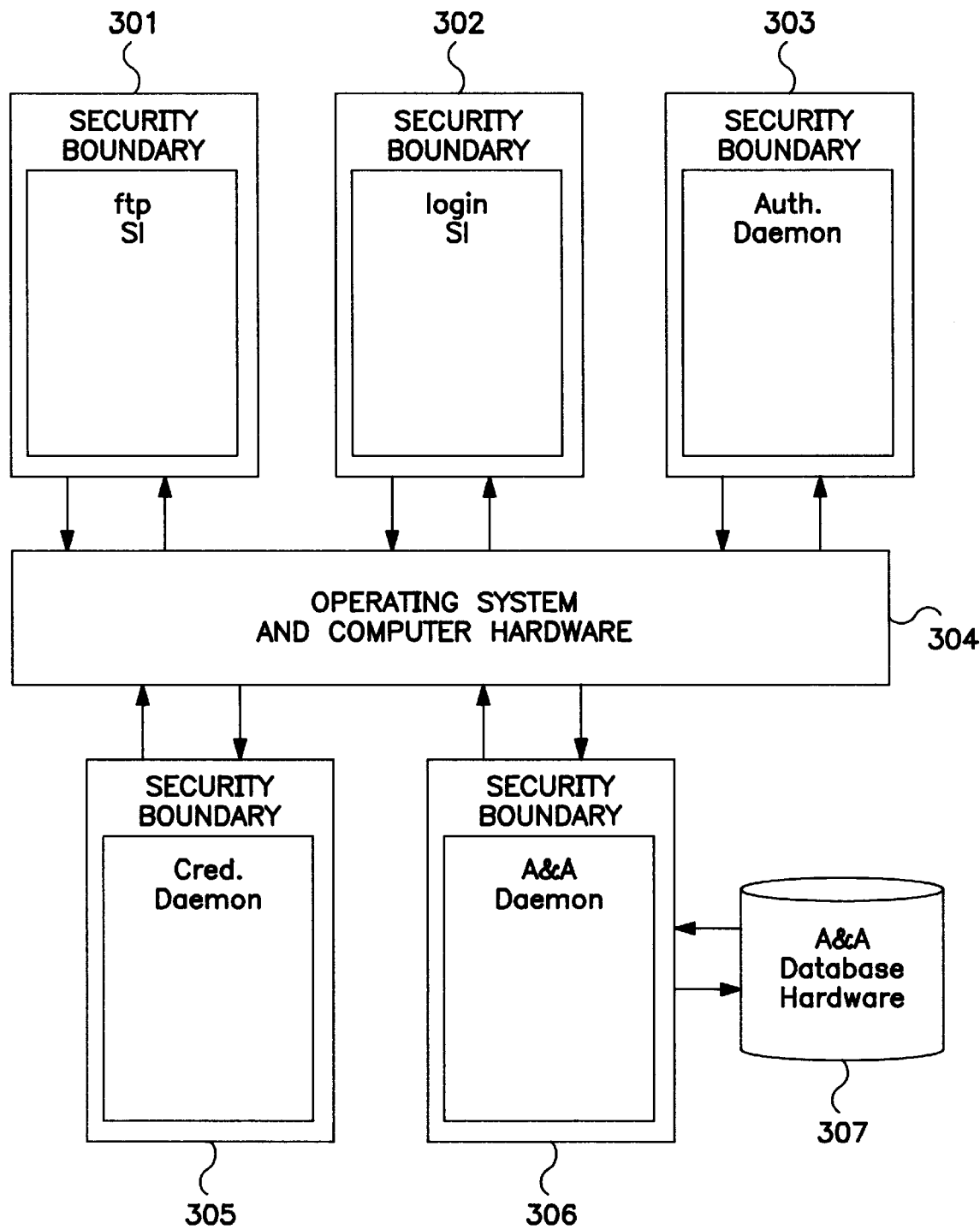
FIG. 3 shows the preferred embodiment of the present invention.

FIG. 3 shows the preferred embodiment of the present invention.

FIG. 3 shows an operating system 304 functionally connected to a plurality of user mode processes through their respective secure boundaries. The ftp SI 301, the login SI 302, the credentials daemon 305 and the A&A Daemon 306 are shown communicating with operating system 304 which isolates each user mode process from all other user mode processes. The A&A is unique because it is also connected the A&A database hardware 307, which implies that all access to the physical storage that holds the A&A data must be made by the A&A Daemon 306 and all other processes are prevented from accessing that storage.

A session service, such as ftp or telnet, which the prior art had implemented as a single process executing in a single address space has been partitioned into multiple processes. In addition, each function in the session service has been given well defined interfaces.

There are a number of benefits of breaking up functions which the prior art had implemented as large monolithic processes. Some of the advantages are:

(a) using uniform well-defined interfaces to make testing and evaluation of a given trust level easier and less expensive; and (b) allowing customers to write their own session initiators or authentication daemons.

In the system shown in FIG. 3, all checking of passwords is done by the password Authentication Daemon (AD) 303. Any change in authentication policy does not affect the ftp Session Inititator (SI) 301 or the login SI 302.

Definition of terms

Process—a software entity given a name (a process ID) that has a set of attributes, credentials, and an address space. The set of attributes may vary. When a process is initiating an action, it is viewed as a subject. When a process is a target of an operation, it is viewed as an object.

Session—a group of processes directly descended from a single process created by the system on behalf of a user. Each session defines the set of potential credentials for any process in the session.

Subsession—a (sub)session started by a command issued from another session (or subsession). The subsession has a subset of the parent session's potential credentials. Each active subsession is assigned a subsession ID.

Subject—an active entity that initiates requests for service; a process that causes information to flow among objects or changes the system state.

Credentials—the characteristics of a subject that describe it, detail its ownership, and define its authority on the system; credentials determine the potential of what a subject can do.

Object—the target of an operation; an entity within the system boundary that contains or receives information. Examples of named objects include files, directories, and processes; unnamed objects include pipes, Internet sockets, and wait queues.

Attributes—the characteristics of an object that describe it, detail its ownership, and define access to it. Attributes define who can do what to an object within the scope of the system security policy.

System Security Policy—the set of rules enforced by the system which controls the creation of user sessions, the access to objects, and the ability to perform restricted operations (for example, adding user accounts).

Trusted Computing Base (TCB)—a combination of hardware, firmware, and software which enforces the system security policy.

Trusted System—a system that consists of:

The TCB.

The hardware and the software governed by the system security policy (for example, printers, tape drives, and user programs).

System Boundary—the limits of the trusted system for which the system security policy is enforced.

Session Service—a command or application program that requires authorization and, in some cases, authentication. Session services for the session monitor are: login, ftp, telnet, crontab, at, su, assume, and newsession.

Access Control Policies

Access control policies ensure that interactions between subjects and system objects conform to the dictates of the system security policy.

MAC—mandatory access control is an access policy that controls a subject's access to information and objects. The system enforces the policy by comparing the sensitivity of the information for the object (its MAC label or MAC tuple) to the MAC tuple of the subject's process. The system also compares the object's sensitivity to the MAC label of the subject's process. The relationship of the MAC label and the MAC tuple determines if a subject can read an object, write to an object, or is denied access to the object.

NOTE: MAC labels and ranges only apply if the system is configured for B1, B2 or above.

MAC label—a label placed on subjects and objects in order to enforce the MAC policy. The label consists of a hierarchical component (classification of information sensitivity) and one or more categories (unrelated groups of users) following the syntax: hierarchy: (category1, category2 . . . ).

DAC—discretionary access control is an access control policy where the degree or type of protection for an object is at the discretion of a user, typically the owner of the object. The owner can assign file access permissions (read, write and execute), and hence restrict the subject's access to the object based upon the identity of the user or the group to which the subject belongs.

CAC—capability access control is an access control policy that controls the subject's access to objects through the implementation of a required capability set for each object. The subject must have all of the capabilities in the object's required capability set to have access to the object. CAC only applies if the system is configured for B1, B2 or above.

MAC lattice—a mathematical structure formed by all MAC labels, ranging from the implementation high label to the implementation low label.

MAC regions—Data General has divided the MAC lattice into three distinct regions:

Administrative—region reserved for system files (data) necessary to administer the system and not readily available to users. An administrative role must be assumed to access this region.

User—region where non-administrative files (data) and site specific data is stored.

Virus Prevention—region reserved for system files and executables that require write protection and need to be readily available to users.

Event—a location in a program where a security-relevant decision is made or recorded.

Operational Event—causes an evaluation to determine if the subject has appropriate privilege to perform a restricted operation (for example, mounting a file system).

Access Event—causes an evaluation to determine whether the subject has the requested access rights to an object (for example, if the subject has read/write/execute access to a file).

Access Override Event—causes an evaluation to determine whether a subject has appropriate privilege to override the failure of an access event (for example, writing to a file whose write permissions would otherwise deny write access).

Audit Event—the recording of security-relevant changes in the system state including decision events (operational, access, and access override events). Each different event that is auditable (for example, the open(2) system call) has a unique identifier. The audit subsystem determines if the result is recorded in the security audit trail.

Session Control and Session Initiators

Session control and its implementation are fundamental to understanding how session initiation works.

Figure 4:
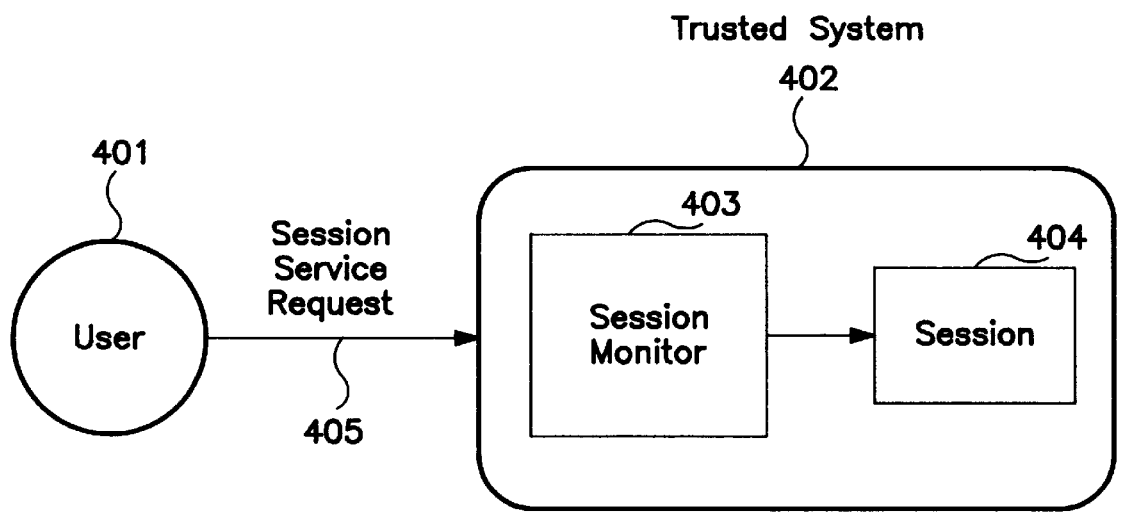
FIG. 4 shows a user making a session service request from a trusted system.

FIG. 4 shows the generic way a user 401 accesses the trusted computer system 402. The TCB has a session monitor 403 which is used to initiate a session 404 in response to a system service request 405 from the user 401.

Figure 5:
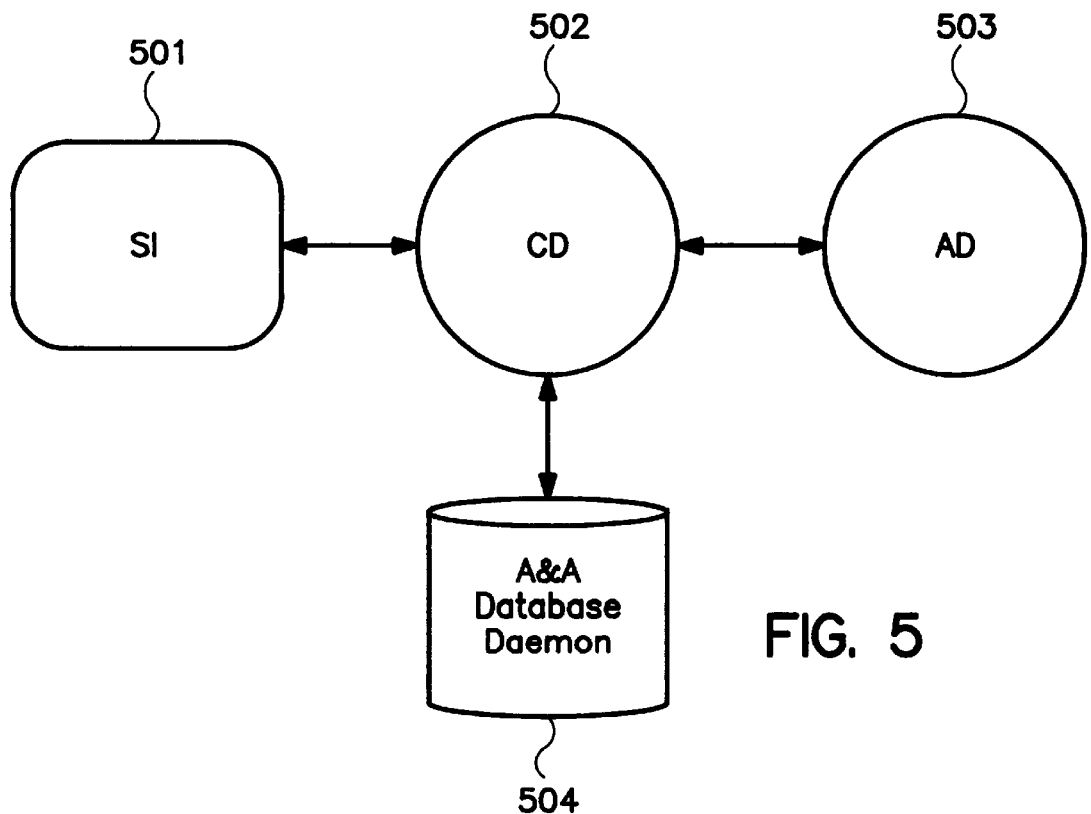
FIG. 5 shows the interaction between a Session Initiator, the credentials daemon and an authentication daemon.

The session monitor 403 is shown in greater detail in FIG. 5. A session initiator (SI) 501 interacts which the credentials daemon (CD) 502. The credentials daemon 502 in turn interacts with at least one authentication daemon (AD) and with the A&A database daemon 504. The arrows (unnumbered) show the only permitted data flows. The CD 502 is used to determine if a session should be started. The information required to start a session is stored by the A&A Database daemon 504. The CD 502 may consult one or more Authentication Daemons (AD) 503. The AD 503 may ask the CD 502 to store information in the A&A database maintained by the A&A database daemon 504. Neither the CD 502 or the A&A Database daemon 504 "understand" the information used by AD 503. They merely make sure data is safely stored for future use.

The session monitor includes a session control mechanism that provides a trusted path for invoking and confirming TCB services. A trusted path establishes unmistakable communication (or connections) between the user and the TCB. It indicates:

(a) The user is communicating with the actual TCB and not an imitator.

(b) The TCB is communicating with an actual user of the system and not a malevolent process.

When the user sends a BREAK, the response is context sensitive. The response the user gets back depends on the state of all of the processes that are associated with that line. The possible responses are:

(a) a login banner if no process is associated;

(b) a repeated prompt if the TCB process is reading authentication data; or (c) the trusted path menu.

This mutual assurance is vital in detecting counterfeit application programs that attempt to trick (spoof) the user or the TCB as described in the following.

(a) A counterfeit application program imitates a session initiator. Invoking the trusted path allows the user to be sure that he is communicating with the TCB by observing the response of the program. For example, a counterfeit login program attempts to gain an actual user's password. The user invokes the trusted path, expecting to see the information prompt requesting the user's password. However, the password prompt is not redisplayed; the response of the counterfeit login program is incorrect. The user can log out (through the trusted path menu) to terminate all the processes running in that session (or subsession) or contact the system administrator to investigate the situation.

(b) A counterfeit application program attempts to bypass the TCB by gaining access to the user's TTY (reading from the user's keyboard or writing to the user's screen).

When the user or the system invokes trusted path, the trusted path is told which device (TTY) made the invocation. The trusted path arbitrates which processes in which subsessions have access to the TTY. The TCB kernel blocks or disarms any process that is not sanctioned via the trusted path. The counterfeit program does not gain effective access to the user's TTY.

In addition to mutual assurance, session control:

(a) Mediates the initiation of subsessions and the switching back and forth between them.

(a) Enforces an idle session time-out.

When multiple subsessions are created, session control ensures that the access to and from the TTY is for the active subsession only and that the new subsession is started with appropriate credentials. The MAC policy for each subsession is kept separately from other subsessions. For example, when a user assumes an administrative role, session control:

(a) Suspends the active session (or subsession).

(b) Helps start the new subsession.

(c) Relabels the MAC labels for the keyboard and TTY to match those of the assumed role.

If a user does not respond with keyboard input for a specified length of time, then the user's sessions and subsessions are terminated. Session control monitors the idle session timer and if it expires because there is no input from the user's TTY, then it sends a warning message to the user. The user has a configurable grace period in which to respond before the sessions are terminated. Enforcing an idle session time-out helps prevent a user from logging on to a terminal and then leaving the terminal unattended.

Session initiators invoke session control. It is essential when requesting a session service to be guaranteed that:

(a) A newly created session (or subsession) is communicating between an actual user and the TCB.

(b) One session (or subsession) only, the active one, has exclusive access to and from the TTY and that the appropriate session credentials and access control are in effect for that session (or subsession).

The trusted path is the session control mechanism that delivers this guarantee for interactive SIs. When a system is started and initialized, the trusted path is always running. It may be invoked explicitly by the user or by the system where it is integrated with session service requests that dialog with the user.

While all session initiators may invoke session control, only interactive SI's do so in order to get a trusted path to the user. (The non-interactive SI is cron, which supports at and crontab session services.)

Incidentally, at and crontab sessions must also pass a form of authentication, which we have named "weak authentication". The authorization(s) for an at or crontab session are linked to authentication procedures in exactly the same way as any other authorization, and the CD calls AD's as prescribed in the selected authentication procedure in the same way as for any other session request, with one exception: cron asserts the DG_CD_B_WEAK_AUTHENTICATION option in its message to the CD, and the CD in turn asserts the DG_AD_A_WEAK_AUTHENTICATION in its message to each AD that may be invoked during the authentication procedure.

Since authentication daemons may be written and installed by customers, the action of an authentication daemon when it receives the DG_AD_A_WEAK_AUTHENTICATION option can be up to the customer, of course. We explain that:

(a) with this option asserted, they must not require input directly from the user; and (b) they are making policy on whether or not the user's at and/or crontab jobs run, based on either some attribute of the authentication data, or possibly other hardware at the site and that they should write their authentication daemons with this in mind.

For the DG-supplied dg_passwd daemon, we have implemented DG_AD_A_WEAK_AUTHENTICATION to mean:

(a) the user is not asked for their password;

(b) if the password in question is in its "frozen", "normal", "warning", or "expired" state, then weak authentication succeeds;

(c) if the password in question is extinct, then weak authentication fails.

Consequently a user's at and crontab jobs will continue to run as long as the password selected by the corresponding authorization(s) would be usable for authentication (presuming the user were present to type it in). But these jobs will fail if the selected password becomes so old that the AD would no longer consider the password acceptable for authentication, even if the user were there and did type in in correctly.

Session Initiators and the Credentials Daemon

The session initiators are shown in FIG. 8. Each session initiator uses session control and is part of the default services in the TCB. FIG. 8 shows the specific SI's that are shown in FIG. 5 as generic SI 501. Of course, additional SI can be created and the list of SI's shown in FIG. 8 is intended to make the role of an SI clear and not as a limitation on the claimed invention.

The user may invoke the trusted path before starting a session or during a session (or subsession). To invoke the trusted path, the user must do one of the following:

(a) On an ASCII terminal, press the Break key.

(b) When logging in to a remote host system with telnet, send the NVT (Network Virtual Terminal) break character to the remote system.

(c) From a DG/UX B2 Security Option system, use the telnet send command to send the Break key signal to the remote host. The steps include:

(i) Press the telnet escape key (Ctrl-] is the default).

(ii) Type "send BRK" and press the Enter key. "BRK" must be typed in upper case.

When logging in, the user should invoke the trusted path before typing his name at the login prompt. When invoked, the trusted path clears all typed-ahead input, starts output, and displays the trusted path banner. The banner indicates that the system has recognized the trusted path key sequence, referred to as the "Break key". The default trusted path banner reads "DG/UX Trusted Path." The banner is configurable. The user may then be asked to type a newline (press the Enter key) before completing the information for the session service.

After displaying the trusted path banner, the trusted path queries the state of the line to see if the user is logged in. If the user is logged in, then the active session is suspended and the trusted path menu displays immediately after the banner. If the user is not logged in, then the login procedure continues (the user presses the Enter key (newline) to redisplay the login prompt) and the user logs in.

Pressing the Break key after logging in displays the trusted path banner and menu as shown in FIG. 6A.

The trusted path menu with numbered menu items enables the user to perform the following system services:

(1) Change the user's password. The passwd program is invoked.

(2) Send an interrupt signal (Break key signal) to the foreground process group of user's active subsession.

(3) Log out of the system by terminating all sessions and subsessions.

(4) Display the session status by listing the status (PID, PPID, UID, command, MAC label) of all processes of the controlling TTY.

(5) Create a new subsession, list the existing subsessions, and choose another subsession to become the user's active subsession. Not all users have permission to create subsessions. If a user does not have permission, this menu item does not appear.

If the subsessions menu item is chosen, then the following menu appears as shown in FIG. 6B.

The subsession control menu with numbered menu items enables the user to:

(1) Create a new subsession with the newsession service that runs with the same or a different MAC label.

(2) Create a new subsession with the assume service to perform an administrative role.

(3) Create a new subsession with the su service to run with a different user ID.

(4) Choose a subsession and make it the active subsession.

(5) List all existing subsessions (subsession name, UID, PID, command, MAC label) and the active subsession.

While the menu or any menu item operations are running, all user processes are blocked from reading or writing to the TTY. When the user quits the trusted path menu or the subsession control menu, the user returns to the previous session that was suspended when the trusted path was invoked.

Programs in the TCB that require user authentication (for example, the user's password) invoke the trusted path to create a trusted communication channel.

When the TCB program requests the trusted path:

(a) The user is notified that the trusted path is in effect. In the present embodiment the notification is fixed, however, in an alternate embodiment the system administrator could change the system configuration to control if and how the user is notified.

(b) The user must press the Break key to continue. In the present embodiment the use of the Break key is fixed, however, in an alternate embodiment the system administrator could configure the key or keys the user must press.

The controlling TTY is now in trusted path mode and user authentication information is read over the trusted communications channel.

Whenever a user sees a display that appears to be a TCB program requesting information using the trusted path, the user can verify the request by pressing the Break key. One of the following occurs:

(a) For a TCB program, the information prompt is redisplayed.

(b) For a counterfeit session or subsession-service-request program, the trusted path menu is displayed.

For example, if the login program is asking for the user's password, the user chooses to press the Break key to verify that the request for the password is genuine. After pressing the Break key:

(a) The trusted path banner is displayed.

(b) The password (information) prompt appears.

If the login program is a genuine TCB login program the user would see the prompt shown in FIG. 9. The user may press the Break key multiple times, and each time the information prompt is redisplayed. When the program receives the requested information, it exits the trusted path and returns to normal processing.

When a counterfeit login program is running and the user presses the Break key, trusted path displays the trusted path banner followed by the trusted path menu. The appearance of the menu instead of the expected information prompt alerts the user that something is wrong.

When a non-TCB genuine program that does not require an information prompt (for example, csh) is running and the user presses the Break key, trusted path displays the trusted path banner and the trusted path menu.

A user may press the Break key at any time to verify that he or she is actually interacting with the TCB. Various session and system services can be invoked from the trusted path menu and the subsession control menu. When invoked from the menu, the user may not be asked to press the Break key before the authentication information is requested.

When the user is in the trusted path mode, only processes with appropriate privilege can communicate via trusted path. No other processes are notified that characters are being transmitted through the trusted communications channel.

The operating system intercepts the Break key outside the normal TTY data paths so that user processes never read the Break key as data, hence it is never delivered to user processes nor can it be captured by a counterfeit program trying to imitate the trusted path.

A user with the privilege to create subsessions may start multiple subsessions. The processes running within a subsession are grouped under the subsession's ID. The security attributes (for example, MAC label, UID) for each subsession are saved separately from other subsessions' attributes. The trusted path allows one session (or subsession) only— the active one—to have access to the TTY. Processes in the other subsessions can continue to run in the background, but are blocked when they try to read from or write to the TTY. Hence, they are prevented from using the TTY as a channel to bypass system security.

Credentials (security attributes) and other session attributes are assigned to the new processes created by session initiators (SIs). The SI asks the credentials daemon (CD) if it is OK to initiate the session and if so, what are the credentials and other session attributes for the process. The CD communicates with the A&A database daemon and authentication daemons (ADs). If the user is authorized and successfully authenticated, then the CD sends the credentials and other session information back to the SI.

The CD is started by init and runs in administrative space. It calls a library routine to create a named pipe, /etc/credentiald, for communication between the SI and the CD.

Figure 7A:
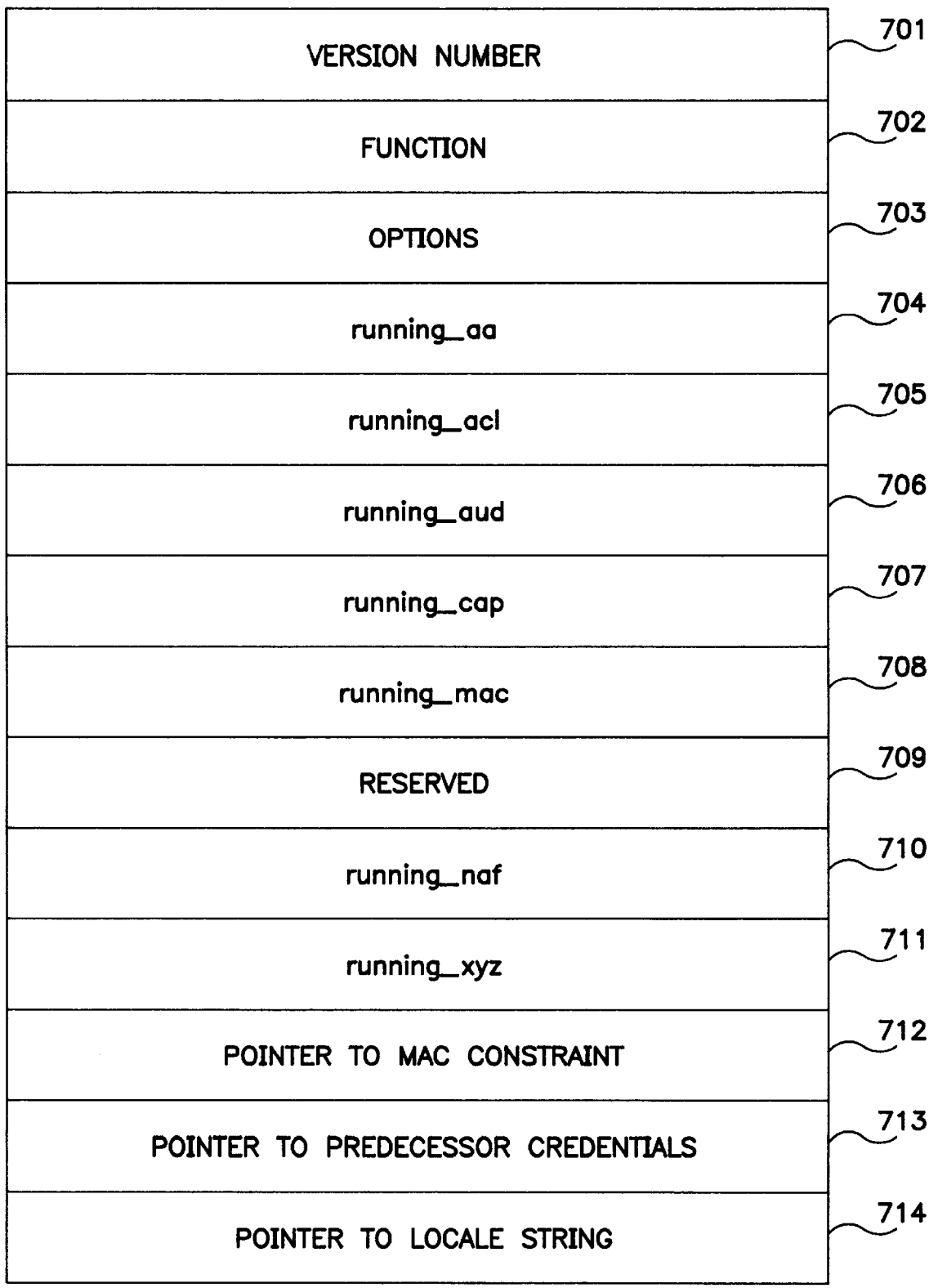
FIGS. 7A, 7B, 7C, 7D show the CD kit.
Figure 7B:
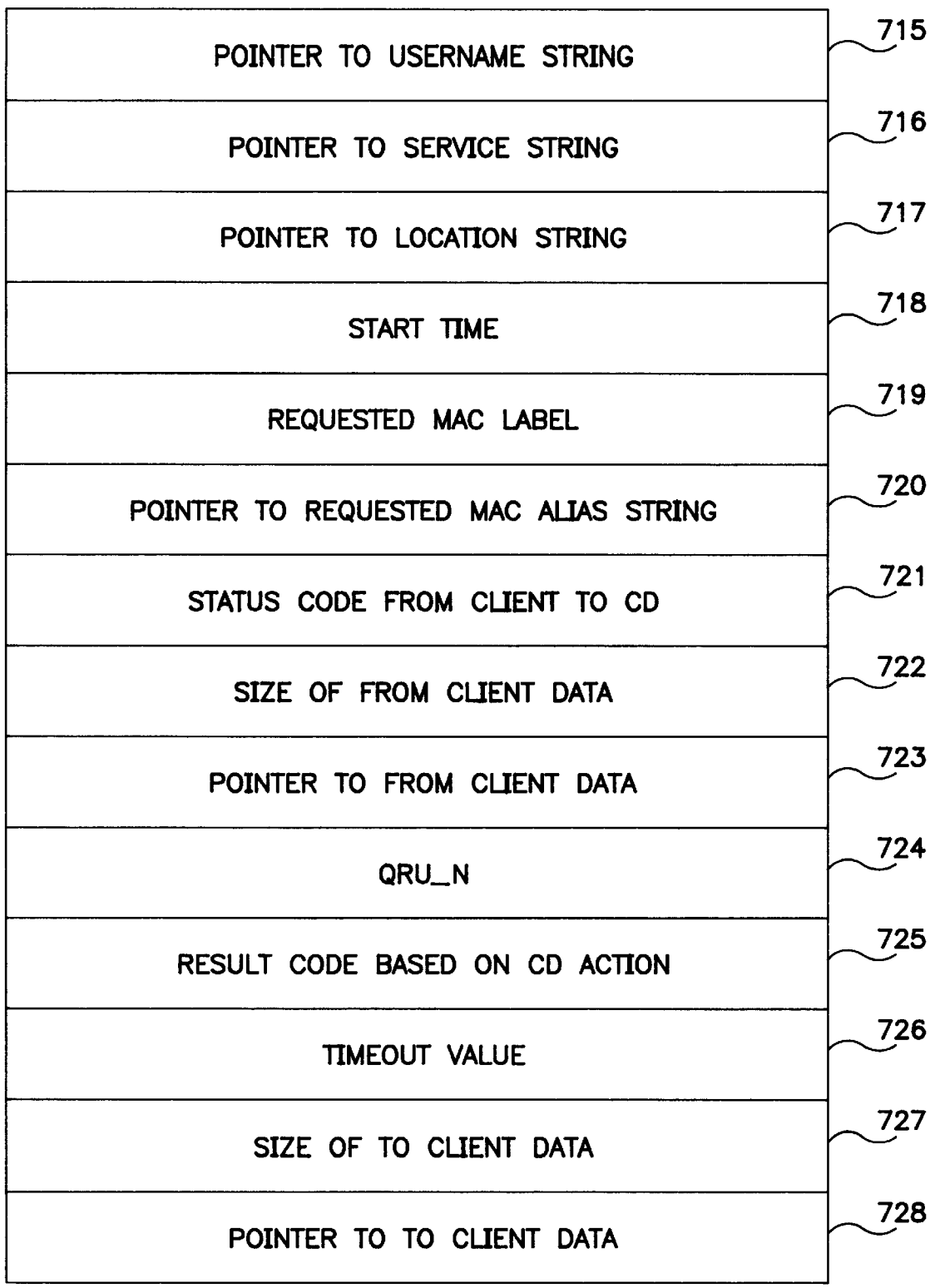
Figure 7C:
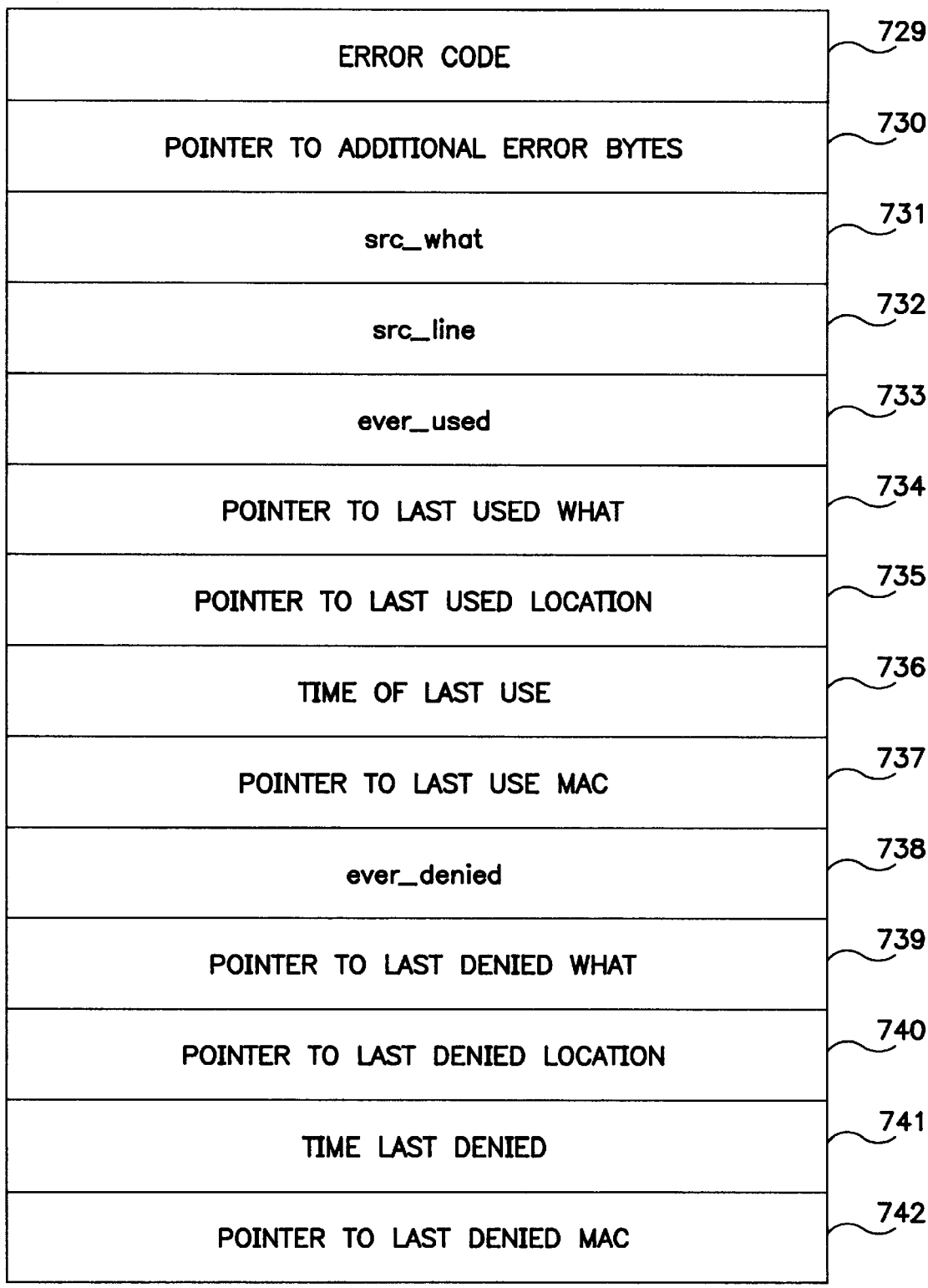
Figure 7D:
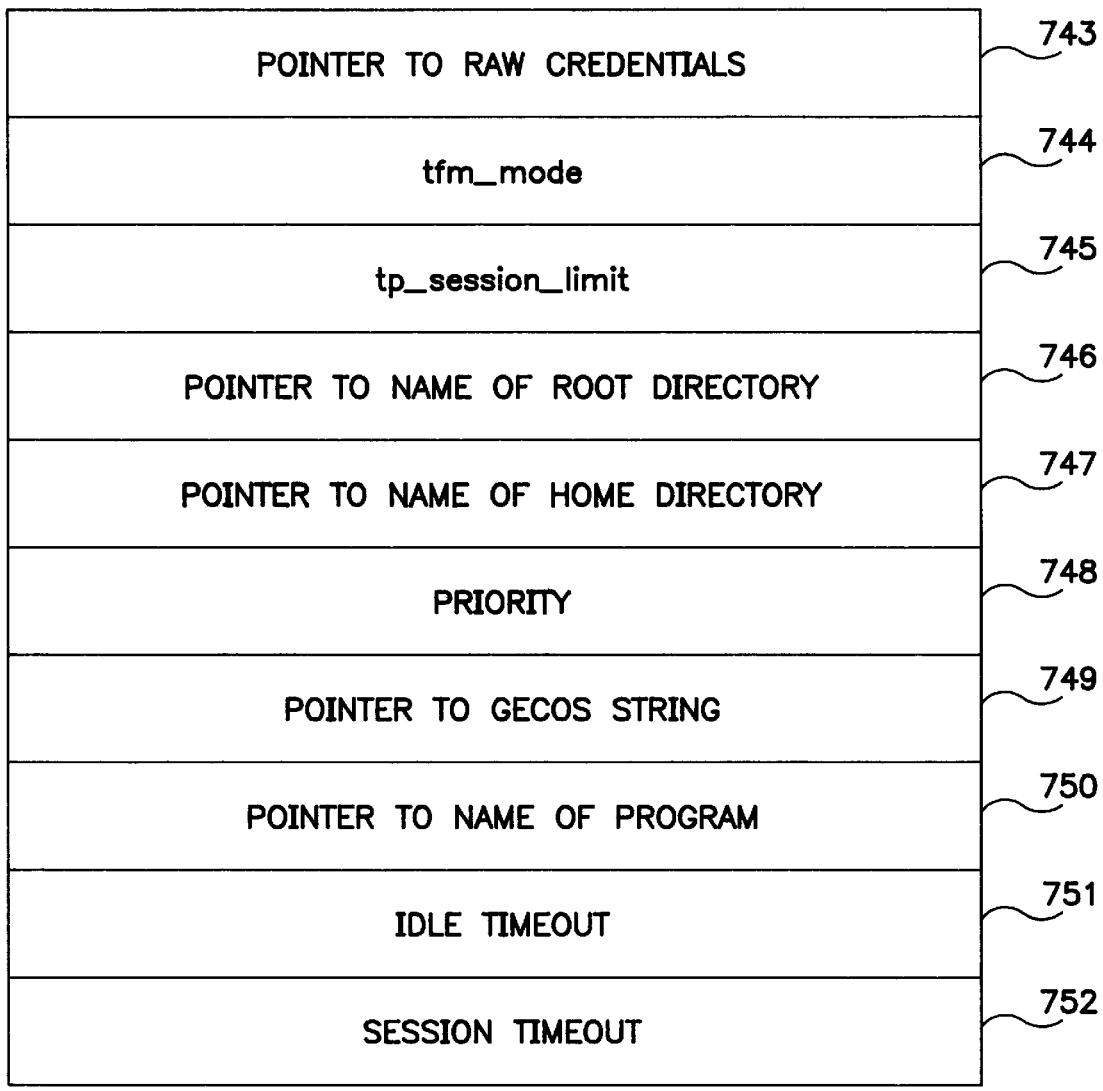

The SI communicates with the CD via the named pipe by passing information in a structure called the credentials daemon transaction kit. The structure of the credentials daemon transaction kit is shown in FIGS. 7A, 7B, 7C, 7D. There are three processing parts to the kit:

(a) Initial SI information passed to the CD. These are shown in FIGS. 7A and 7B as blocks 701 to 720.
(b) Intermediate CD processing (user authentication, if required). These are shown in FIGS. 7B and 7C as blocks 721 to 732.
(c) Final CD information passed back to the SI. These are shown in FIGS. 7C and 7D as blocks 733 to 752.

The SI creates a kit and passes parameters and constraints to the CD. The parameters are choices that include:

(a) Function passed in 702 is a description of the function request There are four functions that an SI can request from the CD:
  (i) begin a session;
  (ii) reauthenticate;
  (iii) queue a session to begin at a future time; or
  (iv) reauthorize;
(b) options passed in block 703 for the function are requests to bypass:
  (i) A location, account, or authentication that is locked (barred from entry).
  (ii) An account or authentication that is extinct (passed the authorized length of time).
  (iii) An account that is stale (has not been used in a designated length of time).

SIs assert authentication options; they are determined by the SIs' policies. Even though an SI may assert an authentication option, the CD checks if the user (or role) has the appropriate privilege for the option. If not, the option is denied.

(c) System security configuration flags are turned "on" or "off" if the current process' system is running with ACLs 705, auditing masks 706, MAC 708, capabilities 707, and interfaces with the A&A database subsystem 704. The client sets these boxes to 1 if the system is configured with the corresponding subsystem.
(d) The MAC constraint pointed to by block 712 limits how the CD may fulfill the session initiation request: MAC label limits (for user, administrative, and virus prevention spaces)—the limitations of the process' MAC label regarding the space. An example is MAC tuple on the device where the request originates. The device MAC tuple for user space could be USER_HI to USER_LO.
(e) A pointer to a list of the predecessor credentials of the subject requesting authorization from the CD are passed in block 713. These credentials help determine the new process' credentials. The CD also uses these credentials to decide what a user can do. For example, the user with particular capabilities may be able to bypass authentication or other options. The credentials are the MAC label, MAC tuple (formerly called MAC range), UID, GIDs, set of capabilities, AUTHID, audit mask and authinfo records. The session initiators for the Unix commands su, assume, newsession, crontab and at pass predecessor credentials, but login, telnet and ftp do not.
(f) A pointer to the name of the user or the role that the user wants to become is passed in block 715.
(g) A pointer to the name of the service (for example, "login", "ftp", "su", "assume") is passed in block 716.
(h) A pointer to an identifier of the user's location when the request is made; where (as precisely as known) the user accesses the system to make the request is passed in block 717. Examples of identifiers include the IP address and TTY name.
(i) The time when the session is requested to begin is passed in block 718. For example, login uses the current time, meaning that the requested session is to begin "immediately."
(j) A pointer to a string giving the language for the error messages is passed in block 714.
(k) The requested mandatory access capability (MAC) label in binary format is passed in block 719. Block 719 is not used if block 720 is used.

(l) A pointer to the alias name (in ASCII) of the requested MAC label (for example, ACCRED_LO) is passed in block 720. Block 720 is not used if block 719 is used.

The SI and the CD exchange information via the credentials daemon transaction kit. Then the final CD information is passed back to the SI. If authentication is required and the AD needs keyboard input from the user, the AD must interact with the SI through the CD. In this case, the CD passes authentication instructions to the SI; the SI obtains the user's authentication information.

The following steps outline the intermediate processing when the AD requires keyboard input from the user. If no keyboard input is required, only the first and last steps occur.

(a) The SI has sent the CD kit with the initial information to the CD.

(b) The CD starts the intermediate processing and sends responses to the SI. The CD's responses (action commands, status) are in the clue field of the kit 725.

(c) The SI reads the responses from the CD and performs them. For example, the CD tells the SI to open a window, to display certain text, and to get the response to the text (steps for requesting a user's password). The CD receives the authentication instructions (action commands) from the AD and passes the information to the SI.

(d) The SI sends the user's responses (data) and the action response (for example, action-performed-OK) back to the CD. The user data is often the key means for determining if the user can be successfully authenticated.

(e) The SI knows the intermediate processing is completed when the CD responds with a success, failure, time-out or error.

The intermediate processing supports a time-out if a process (or person) takes too long. For example, if a time-out is specified, then the user must type his password within the specified amount of time. All of the components (SI, CD, AD) gracefully handle this condition.

If the CD responds with a failure, time-out or error, then the session service request is halted. If the CD responds with a success, then user's credentials and other session attributes for the particular request are passed back to the SI. The final CD information includes:

(a) User account information
  (i) If this user has used this account 733.
  (ii) The user's last service 734, location 735, time 736 and MAC label 737.
  (iii) If the user has been denied use of this account 738.
  (iv) The user's last-denied service 739, location 740, time 741 and MAC label 742.

The login, ftp and telnet services write this information on the user's screen when the user initiates a session.

(b) A pointer to the user's credentials appropriate for the request is passed back in block 743.

(c) Trusted path session limit—the number of subsessions that the user is allowed is returned in block 745.

(d) A pointer to the user's initial root directory is returned in block 746.

(e) A pointer to the user's initial home directory is returned in block 747.

(f) The initial priority assigned to the user's process is returned in block 748.

(g) A pointer to commented text about the account, called GECOS is returned in block 749; for example, the user's real name.

(h) A pointer to the path and name of the program to be exec'd in the user process is returned in 750. Some SIs, for example ftpd, do not exec a program but run the session in their own address space.

(i) The user's time-out value for an idle session is returned in 751.

The general flow for session initiation services that cross the system boundary follow these steps.

(a) The SI determines the parameters and constraints for the request and puts them in the credentials daemon transaction kit. There are no predecessor credentials in the CD transaction kit because these session initiation requests cross the system boundary.

(b) The SI sends the CD transaction kit to ask the CD if the requested session is authorized, and if so, asks for the session credentials and other attributes.

(c) If the user has the session service authorization, then the user is authenticated (for example, with a user's password). When authentication occurs, the session service invokes trusted path. If the user does not have the session service authorization, authentication still takes place but the request will fail regardless of the outcome of authentication.

(d) If the user is authorized and authenticates successfully, then the CD passes back the user's session credentials. The session initiator starts the session with the raw credentials received from the CD.

The ftp service transfers files to and from a remote network site.

The service is implemented with an ftp client that calls the remote host and passes a MAC label value extracted from the client's credentials via the trusted IP to the host. To handle the client request, the inetd (on the remote host) forks a child process and execs the ftpd server. The ftpd creates the CD transaction kit including the requested MAC label and MAC label limits the same as the client's. No predecessor credentials are sent. Ftpd passes the CD kit to the CD for user authorization and authentication. Ftpd sets the raw credentials received from the CD on itself.

The telnet service logs in to another host, using the TELNET protocol.

The service is implemented with a telnet client that calls the remote host and passes the client's credentials via the trusted IP to the host. To handle the client request, the inetd (on the remote host) forks a child process, sets the client's credentials on the child process, and execs the telnetd server. The telnetd forks a child that execs the login session initiator. Login creates the CD transaction kit with the requested MAC label the same as the client's. No predecessor credentials are sent in the CD kit.

General Service Flow for Crontab, At, Su, and Assume follow these steps:

(a) The SI determines the parameters and constraints for the request and puts them in the credentials daemon transaction kit. The predecessor credentials are a parameter in the CD kit because these session initiation requests originate from within the system.

(b) The SI sends the CD transaction kit to ask the CD if the requested session is authorized, and if so, what are the session credentials and other attributes.

(c) If the user has the service authorization and authentication is required, then the user is authenticated (for example, with a user's password).

(d) If the user is authorized and successfully authenticated (if required), then the CD passes back raw credentials appropriate for the session. The session initiator merges the predecessor credentials with the raw credentials and starts the session.

The crontab service is a scheduled-execution service which executes specified jobs at specified times. It runs in the user or role session with the credentials and environment as specified for the user by the system administrator.

When the user submits a crontab job request, it is placed on cron's queue. Immediately before the job is run, the cron daemon:

(a) Reviews the submitting subject's authority to create the previous chain of sessions and subsessions from which this job was submitted. For example, if the system administrator locked a user's account or removed a service from the account after the crontab request was submitted, the review fails and the job is not run.

(b) Checks the user's authorization (session parameters and constraints) and authentication to verify that the job can run. The user is weakly authenticated.

Step (a) addresses the unique security threat that a job might run long after the responsible user has had his authority reduced or has left the organization.

The user that submits (queues) the crontab job is the last person to touch the file and is responsible for it. The user's credentials define the crontab job's accountability (AUTHID), containment attributes, and authority-to-submit history. The user name of a crontab job is either:

(a) Name of the user that submitted the job request.

(b) Name of the user specified with the crontab command, assuming that the user or role submitting the crontab job has appropriate privilege.

The cron daemon reviews a crontab job's "authority to submit" by inspecting the submitter's parameters and constraints in the authinfo history and replaying each of the corresponding session requests to the credentials daemon, using the weak authentication option. If any of the replays fail, the cron daemon refuses to run the job.

The authority to run a crontab job is checked in the usual manner by sending a session request to the credentials daemon. When the cron daemon attempts to run the crontab job, it performs the following:

(a) The cron daemon takes the predecessor credentials off the queue and puts the parameters and constraints in the transaction kit.

(b) The cron daemon asks the CD if the service is authorized. The CD checks that the user is still allowed to run the crontab job at the requested time and from the location where it was submitted.

(c) If the user is authorized, then the crontab job is weakly authenticated.

(d) If the crontab job is successfully authenticated, the cron daemon merges the credentials and the job is run.

The predecessor credentials and the raw credentials are merged as follows:

(a) Use the predecessor credentials' AUTHID.

(b) MAC label is new (from the raw credentials) The SI requests the previous MAC label as a parameter in the CD kit, and the logic of the session monitor guarantees that the requested MAC label is the one returned in the raw credentials.

(c) MAC tuple is new.

(d) Capabilities are new.

(e) Audit masks are unioned.

(f) New authinfo record is added to the predecessor credentials' authinfo stack.

The at service is a delayed-execution service which reads commands from the command line for execution at a specified time. It runs in the same environment from which the at service was submitted.

The at service is implemented with the at session initiator portion of the cron daemon. When the user submits an at job request, it is placed on cron's queue. Like crontab, immediately before the job is run, the cron daemon:

(a) Reviews the submitting subject's authority to create the previous chain of sessions and subsessions from which this job was submitted. For example, if the system administrator locked a user's account or removed a service from the account after the at request was submitted, the review fails and the job is not run.

(b) Checks the user's authorization (session parameters and constraints) and authentication to verify that the job can run. The user is weakly authenticated.

An at job is designed to run with its predecessor credentials; the raw credentials provide limitations for the predecessor. This differs from other session services that are designed to run with their raw credentials, where (depending on the SI's policy) some predecessor credentials may provide limitations for the raw.

Since the at job design is unique, special attention is given to limiting (containing) the UID, GID, and supplementary groups when merging. The GID and supplementary groups combined are referred to as the "group set." NOTE: the rationale for at differs from the credential-merge rationale of the other SI's, but at nevertheless uses the same mechanism.

The predecessor credentials and the raw credentials are merged as follows:

(a) Use the predecessor credentials' AUTHID.

(b) Use the predecessor UID; it must match the raw UID, else the job is not run.

(c) Use the predecessor GID; it must be in raw group set, else the job is not run.

(d) Intersect the predecessor supplementary groups with the raw supplementary group set.

(e) MAC tuples are intersected.

(f) MAC label is new (from the raw credentials) The SI requests the previous MAC label as a parameter in the CD kit, and the logic of the session monitor guarantees that the requested MAC label is the one returned in the raw credentials.

(g) Capabilities are intersected.

(h) Audit masks are unioned.

(i) New authinfo record is added to the authinfo stack unless the top authinfo record matches the new record with the same session parameters, but different starting times. If there is a match, the top authinfo record is replaced with the new authinfo record.

The su service is used to assume the identity and part of the security credentials of another user. When the system administrator gives the user the su service, this means that another person or role can su to the user. A person can su from a user to another user or from an administrative role to another user.

For su, the new user must be authorized and authenticated (if required). If the requesting subject has the appropriate privilege, then authentication is not required.

If the user chooses su from the Subsession Control menu, the prompt asks for the following:

(a) New user name.

(b) Name of the subsession.

(c) User's password (or authentication information).

For su from user to user the predecessor credentials and the raw credentials are merged as follows:

(a) Use the predecessor credentials' AUTHID.
(b) MAC tuples are intersected.
(c) Capabilities are intersected.
(d) The MAC label is new (from the raw credentials). The user can request a new MAC MAC label. If the user does not do so, the SI requests the previous MAC label.
(e) Audit masks are unioned.
(f) New authinfo record is added to the authinfo stack.

For su from administrative role to user the predecessor credentials and the raw credentials are merged as follows:

(a) Use the predecessor credentials' AUTHID.
(b) MAC tuple is new (from the raw credentials).
(c) Capabilities are new.
(d) MAC label is new. The user can request the MAC label or the default MAC label is returned.
(e) Audit masks are unioned.
(f) New authinfo record is added to the authinfo stack.

The assume service is used to assume an administrative role. Administrative roles (for example, sysadmin) have the assume service authorization. A user can assume an administrative role or an administrative role can assume an administrative role.

For assume, the user's new role must be authorized and authenticated (if required). If the user had the appropriate privilege, then authentication is not required.

If the user chooses assume from the subsession control menu, the prompt asks for the following:

(a) Role name.
(b) Name of the subsession.
(c) Role's password (or authentication information).

The predecessor credentials and the raw credentials are merged as follows:

(a) Use the predecessor credentials' AUTHID.
(b) MAC tuple is new (from the raw credentials).
(c) Capabilities are new.
(d) MAC label is new. The user requests the MAC label or the default MAC label is returned.
(e) Audit masks are unioned.
(f) New authinfo record is added to the authinfo stack.

The newsession service creates a new session. This session is a copy of the active session with the credentials and other session attributes of the active session when it first started.

The service is implemented with the newsession session initiator. The copy of the active session requires authorization or reauthentication if a new MAC is requested.

The merging of the credentials depends upon what type of session is being copied or recreated. There are two types: additive and base.

An additive session's credentials are dependent on the previous sessions' credentials. The additive session includes su (user to user). For example, MAC tuples and capabilities intersect the previous credentials with the raw credentials. The result of merging user-to-user su credentials has an additive effect. When newsession creates an additive session, it follows the user-to-user su credentials merging policy.

A base session's credentials depend on (for the most part) the raw credentials received from the CD. The base session includes login, ftp, telnet, su (role to user), and assume. When newsession creates a copy of a base session, it follows the same policy as assume.

Credential Daemon

The credential Daemon, called credentiald, is the central component in the Session Monitor, which is that portion of the system responsible for making decisions on user access. credentiald should be running at all times and is therefore started by init at system boot time and any time it exits.

The Session Monitor works on a Client/Server model, with credentiald being the main server in the process. Session Initiators, such as login, act as clients, submitting session initiation requests to credentiald. Since this communication process may reveal information about the system to which access should be restricted, only processes with appropriate privilege are allowed to communicate with credentiald. If a process which does not have appropriate privilege attempts to communicate with credentiald, its request will be rejected and a note of the attempt will be made in syslog.

If auditing is configured, credentiald will audit both successful and failed session creation attempts. Note that it will audit only failures that occurred for security reasons, whereas failures that were caused by system errors are recorded through the syslog mechanism. The data audited are the parameters passed to the credential daemon by the session initiator (e.g., login) which determined whether or not access should be granted. These are the username, service, location, time, and, on systems configured for MAC, the requested MAC label.

Programs communicate with the credential daemon using interface routines in libsm.a.

The interface routines are:

```
int      dg_cd_client_to_agent_fd ( )
int      dg_cd_fd_close (int fd)
int      dg_cd_kit_create (dg_cd_kit_t ** cd_kit_pp)
void     dg_cd_kit_free (dg_cd_kit_t ** cd_kit_pp)
int      dg_cd_kit_send (int fd,
                         dg_cd_kit_t ** cd_kit_pp)
int      dg_cd_kit_receive (int fd,
                            dg_cd_kit_t ** cd_kit_pp)
```

Description

The functions in cd_library provide support for communicating with the credential daemon, credentiald, and therefore for session creation.

The functions return 0 on success and −1 on failure, unless otherwise noted.

dg_cd_client_to_agent_fd

This function establishes the connection to the credential server. On success, it returns a file descriptor (a non-negative integer) that should be used as an argument to the other functions in this family that require an fd argument. On failure it returns 0 and sets errno to indicate the error. Use of this function requires appropriate privilege, as access to credentiald is restricted by the system. On a system configured for capability (i.e. dg_running_with_cap( ) returns 1), the process calling this function must have the capability DG_CAP_SI_ACCESS_CREDENTIALD in its permitted set in order to succeed. On a system which is not configured for capability, the process must have a user id of 0. If the process does not have appropriate privilege, this function will still appear to succeed, but credentiald will immediately drop the connection, and subsequent attempts to use the fd returned by this function will fail.

dg_cd_fd_close

This function closes the connection to the credential server. It takes as an argument the file descriptor that was returned by dg_cd_client_to_agent_fd( ).

dg_cd_kit_create

This function allocates and initializes a new dg_cd_kit_t structure as shown in FIGS. 7A, 7B, 7C, 7D. Its argument should be the address of a pointer, which will be set to point to the new structure on return.

dg_cd_kit_free

This function frees all the memory associated with the dg_cd_kit_t * whose address is the argument to the function. It frees both the structure and any fields of the structure that are pointers that are not NULL.

dg_cd_kit_send

This function sends the kit pointed to by the pointer whose address is the second argument of the function to the credential server, which it assumes is listening at the other end of fd. fd should be previously obtained by a call to dg_cd_client_to_agent_fd( ). The kit passed in is treated in a read-only manner by the function—the data in it is simply copied across the connection to the credential server.

dg_cd_kit_receive

Receive a kit from the credential server via fd. fd should be the file descriptor returned by a previous call to dg_cd_client_to_agent_fd( ). cd_kit_pp should be the address of a pointer which is set to NULL. The function will allocate a new kit, read the data from the credential server, and store the incoming data in the new kit. Finally, it will set the pointer pointed to by cd_kit_pp to point to the new kit. When it is no longer needed, the received kit can be disposed of with a call to dg_cd_kit_free.

dg_cd_kit_{get,put}_functions

The various fields of the dg_cd_kit_t structure should not be accessed directly with the C language's '.' or '→' operators. Instead, all access to the internals of the kit should be through the various get/put functions that are provided. The precise list of these (with function prototypes) is available in the header file dg_cd_interface.h. These functions define what should be considered the kit, rather than the structure definition itself. The structure may change in the future, but compatibility will be preserved through the function interfaces. The various "options" fields, such as B_BYPASS_LOCATION_LOCKED, should be boolean values: 1 indicates that the option is turned on, 0 indicates that it is turned off.

In order to cleanly separate authentication functions into customer written authentication daemons, it was necessary to identify all areas in which the system deals with authentication information, and make sure each of the corresponding operations was incorporated into the general Authentication Daemon interface.

These are the six functions:

(a) DG_AD_A_AUTHENTICATE—replaces all instances of code that encrypts and compares passwords. Extends to other forms of authentication data.

This is the AD function that is requested by the CD when a user is to be authenticated prior to establishing a session as described above.

(b) DG_AD_C_CHANGE_DATA—replaces all instances of code that encrypts and replaces the encrypted password value for future comparisons.

This AD function is used by the passwd and admauthdata commands. When a user or administrator invokes one of these commands to change a specific authentication record, the command retrieves this record from the A&A database subsystem, and sends it to the appropriate AD with a request that the DG_AD_C_CHANGE_DATA function be carried out. The command then supports any dialog in which the AD wishes to engage the user or administrator, in the same way that the CD and SI's support such dialogs during authentication. When the AD decides the dialog is complete, it sends an updated authentication record back to the passwd or admauthdata command, which causes this new record to replace the old record in the A&A database subsystem.

(c) DG_AD_I_INITIALIZE—replaces code that constructs initial contents of encrypted password record. Used during system setup, adding users, etc., where no keyboard/other input is desirable.

This AD function is not used in the present embodiment of this invention. In an alternate embodiment of this invention, it could be used to construct "empty" authentication records for initial user and role accounts on a newly installed system, or for user and role accounts being added by an administrator, in situations where it would be desirable to construct these new authentication records without further interaction between the AD and the installer or administrator.

(d) DG_AD_N_CREATE—similar to (c), but interacts with Administrator to get the initial authentication data.

This AD function is used in the admauthdata command, by system administrators, to construct authentication records for newly added user or role accounts, and to construct such records newly added to existing user or role accounts. In an alternat embodiment of the present invention, it could also be used to construct authentication records for initial user and role accounts on a newly installed system.

(e) DG_AD_P_PRINT_DATA—replaces code that formats or presents authentication data for external viewing. Details left up to the Authentication Daemon, but should respect requirements to protect the data against unauthorized access.

This AD function is used in the admauthdata command, by system administrators, in connection with listing and modification of information in an authentication record. When an administrator invokes the admauthdata command with a request to "print" the information about a particular authentication record, the admauthdata command fetches that record from the A&A database subsystem, and sends it to the appropriate AD with a request to carry out the DG_AD_P_PRINT_DATA function. The AD returns a printable representation of whatever information it sees fit to communicate about the authentication record in question.

In the present embodiment, for example, this information for a password record includes time stamps and life cycle parameters available to administrators but not to users. Other AD's, in other embodiments, may present other information. The AD may also allow an administrator to alter some or all of this information by further use of the DG_AD_C_CHANGE_DATA function described above.

(f) DG_AD_V_VERIFY_DATA—to support the verification utility.

This AD function is used by the passwd and admauthdata commands, and by the A&A database verification utility.

It is used by the passwd and admauthdata commands when a user or administrator invokes the command with the intention of interactively selecting an authentication record to alter. In this case, the command interrogates the A&A database subsystem for a list of the user's authentication records, and submits each one to the corresponding AD with a request to carry out the DG_AD_V_VERIFY_DATA function upon it. Then the command displays the results of each such DG_AD_V_VERIFY_DATA operation. The user or administrator views the resulting information about each authentication record, and identifies the one they wish to change.

The passwd or admauthdata command then sends that authentication record, together with the DG_AD_C_CHANGE_DATA function, to the AD, and proceeds to change its authentication data as above.

For each authentication record in the A&A database the verification utility calls the corresponding AD and invokes this function. It interprets the results of each such DG_AD_V_VERIFY_DATA operation, and issues note, warning, and error messages as appropriate. For example, in this embodiment it is considered an error when an AD reports that an authentication record is not in an acceptable format, or contains corrupted data.

Using Multiple ADs

It is often desirable to use multiple ADs. For example, a password checker and a smart card reader. Sometimes one of the ADs needs to update the A&A database. For example, it may force a user to change his password if the password is too old. Our invention is unique by first calling each AD to authenticate the user and then making a second pass to update any data that needs to be changed. This prevents an attacker who learns a password but does not have the smart card from changing the password and denying service to a legitimate user. In the preferred embodiment an authentication record may be in one of several states:

(a) frozen—locked out or suspended;
(b) normal;
(c) warning—it will expire soon;
(d) expired; or
(e) extinct—this authentication data is old enough that we no longer believe the named user is the only person who knows it.

Figure 10:
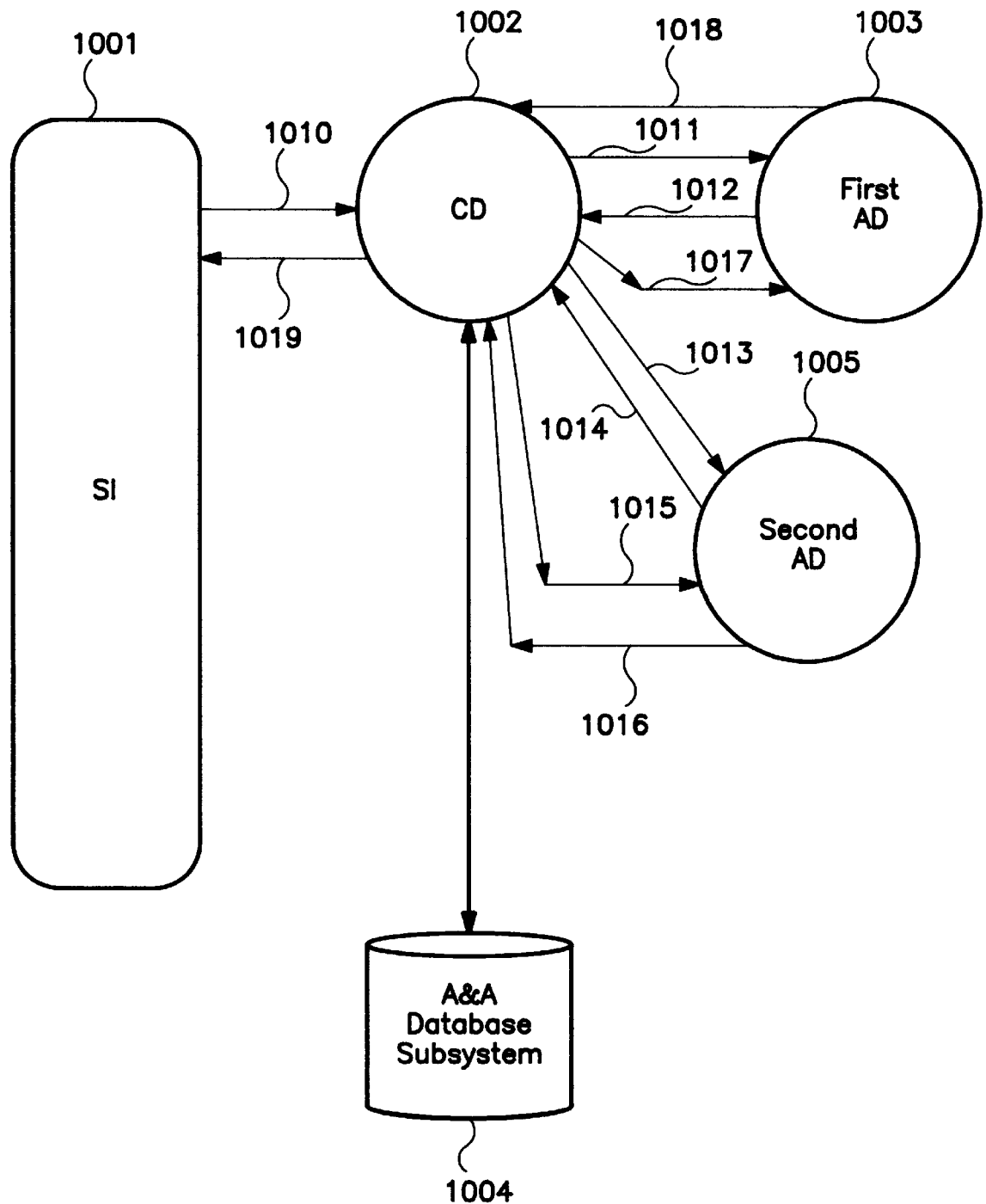
FIG. 10 shows the flow of messages between an SI, the CD and two ADs.

An example of a possible message flow for using multiple ADs is shown in FIG. 10. The SI 1001 sends a message 1010 to the CD 1002. The CD 1002 sends a first message 1011 to the first AD 1003 and gets response 1012. The CD 1002 then sends a message 1013 to the second AD 1005 and gets response 1014. Now CD 1002 knows the user is authentic and sends a second message 1017 to the first AD 1003 and gets response 1018. At this point the CD 1002 may cause the A&A database 1004 to be updated. The CD 1002 then sends a second message 1015 to the second AD 1005 and gets response 1016. Again, the CD 1002 may update the A&A database 1004.

The A&A database 1004 is updated with information reflecting success after all of the AD authenticate the user.

Credentials Merge

Credentials are the information associated with a "subject" that the system uses to manage accountability, and grant/deny access to system objects. Credentials are partitioned into the following 7 subsets:

(a) "AuthId"—AUTHID (only);
(b) "Cred"—UID, GID, supplementary groups;
(c) "MacLabel"—MAC label (only, not tuple);
(d) "MacRange"—MAC tuple (old terminology;
(e) "Cap"—capability state;
(f) "AuditMask"—Audit mask;
(g) "AuthInfo"—authinfo.

Each of these credential components has associated with it one or more operations that are allowable when "merging" or "combining" new (also called "raw") credentials with predecessor credentials (if any).

Predecessor credentials, are the credentials (if applicable) of the subject who's requesting a new session or subsession—if this request is being made from within the system. (i.e., if the request is from a user who has already logged on) and uses a Unix command to ask for different credentials like su, assume, crontab, at, etc., the nature of the request is such that it can only be made by an already-existing subject (process) now running within the system.

The other session requests, login, ftp, telnet, etc., are all made from outside the system, normally by flesh-and-blood users, not running processes. For these there are no predecessor credentials; so in the model there may be predecessor credentials and there may not, depending on the particular service requested.

The "raw" (new) credentials in every case are the ones delivered by the Credentials Daemon for the particular session requested, if it is authorized.

"Merging" is combining the raw (new) credentials and predecessor credentials (if any), component by component, according to a spec for the particular SI. (This is one of the things that makes different SI's "different".) In order to provide for containment and other overall policy reasons, the operations considered admissible for this procedure are limited, component by component, as described above in the section on Session Initiators.

The rationale for merging at all (instead of always replacing) is that in many cases you would want credentials of a derivative session not to exceed those of the session that spawned it. This is one of the ways we control who can do what, and one of the ways in which we exceed the prior art.

Although the description above contains many specificities, these should not be construed as limiting the scope of the invention but as merely providing illustrations of some of the presently preferred embodiments of this invention. Various other embodiments and ramifications are possible within its scope.

For example, this specification shows the Unix operating system, however, it is straight forward to implement the claimed invention to create a trusted version of the Windows NT operating system.

Thus the scope of the invention should be determined by the appended claims and their legal equivalents, rather than by the examples given.

What is claimed is:

1. A trusted computer system including computer system hardware for at least storing an authentication and authorization database and an operating system for controlling operation of said system hardware comprising:

a plurality of user software processes controlled by said operating system;

said user software processes including a like plurality of software daemons, each one of said daemons being associated with a respective one of said processes and functioning separately from the others;

said computer system hardware and said operating system including means for isolating each one of said daemons from the other to prevent any unauthorized operation of any one of said daemons from affecting the operation of any other of said daemons;

means for selecting one of said daemons to be responsible for accessing said authentication and authorization database;

said operating system including means for preventing any of said processes and their respective daemons other than said selected daemon from reading from or writing into said authentication and authorization database whereby said database is protected from unauthorized access.

2. A method for initiating a session in a trusted computer system having:

(a) computer system hardware;
(b) an operating system for controlling said hardware;

(c) an authentication and authorization database stored in said hardware;

(d) user software controlled by said operating system;

(e) said user software including a plurality of software processes, each one of said processes functioning separately from the others;

(f) said computer system hardware including means for isolating each one of said processes from the other to prevent any unauthorized operation of any one of said processes from affecting the operation of any other of said processes;

(g) means for selecting one of said plurality of software processes as a Session Initiator (SI);

(h) means for selecting a different one of said plurality of processes as the Credentials Daemon (CD);

said method comprising the steps of:

(I) determining the parameters and constraints for said session;

(II) sending an inquiry from the SI to the CD to ask the CD if said session is authorized;

(III) the CD responding to said inquiry by determining if the session is authorized; and (IV) if the CD determines that said session is authorized, sending a first set of session credentials from the CD to the SI to initiate said session.

3. The method according to claim 2 wherein the SI has a second set of credentials and where step (IV) additionally comprises merging said first set of credentials and said second set of credentials to form a merged set of credentials used by the new session.

4. The method of claim 2 wherein said computer system is initiating a session for a user and has means for selecting one of said plurality of software processes as a first Authentication Daemon (AD);

and said determining step (III) additionally comprises:
(I) sending a first message from the CD to said first AD;
(II) authenticating in said first AD the identity of said user;
(III) sending a second message from said first AD to the CD indicating success or failure of said authenticating step.

5. The method according to claim 4 including said first message containing the location of said user.

6. The method of claim 2 wherein said computer system includes a means for selecting one of said plurality of software processes as a first Authentication Daemon (AD) and includes the additional step of initiating a session for a user;

and said checking step (III) additionally comprises:
(I) sending a first message from the CD to said first AD;
(II) authenticating in said first AD the identity of said user;
(III) sending a second message from said first AD to the CD, if said first AD needs keyboard input from said user;
(IV) sending a third message from the CD to the SI in response to said second message;
(V) the SI requesting keyboard input from said user;
(VI) sending said keyboard input from the SI to the CD in a fourth message;
(VII) sending said keyboard input from the CD to said first AD in a fifth message; and
(VIII) sending a sixth message from said first AD to the CD indicating success or failure of said authenticating step.

7. The method according to claim 6 wherein:
(a) said second and said third messages each contain authentication information; and
(b) step (V) displays said authentication information to said user prior to requesting keyboard input.

8. The method according to claim 6 including said first message containing the location of said user.

9. The method of claim 2 wherein said computer system has:
(a) means for selecting one of said plurality of software processes as a first Authentication Daemon (AD); and
(b) means for selecting one of said plurality of software processes as a second Authentication Daemon (AD);

said method including the additional step of initiating a session for a user and wherein said determining step (III) additionally comprises:
(I) sending a first message from the CD to said first AD;
(II) authenticating in said first AD the identity of said user;
(III) sending a second message from said first AD to the CD indicating success or failure of said first authenticating step;
(IV) sending a third message from the CD to said second AD;
(V) authenticating in said second AD the identity of said user; and
(VI) sending a fourth message from said second AD to the CD indicating the success or failure of said second authenticating step.

10. The method according to claim 9 additionally comprising:
(VII) sending a fifth message to said first AD and a sixth message to said second AD after both first and second authenticating steps are complete to indicate if said user was authenticated.

11. The method according to claim 9 including said first AD storing some information as a result of receiving said fifth message.

12. The method according to claim 9 including said first AD sending a seventh message to said CD as a result of receiving said fifth message.

13. The method according to claim 12 including said CD causing said authentication and authorization database to be updated as a result of receiving said seventh message.

14. A method for increasing the difficulty of penetration of a trusted computer system and having minimal effect on legitimate users of said system where said computer system has:
(a) an authentication and authorization database having a plurality of authentication records;
(b) some of said authentication records containing a user identity, an authentication scheme for said user, and an action said user is authorized to perform; and,
(c) a plurality of ports for accessing said computer system;

said method comprising:
(I) suspending the authentication record of an authorized user who fails to be authenticated after a predetermined number of attempts;
(II) suspending the account of a user who fails to be authorized after a predetermined number of attempts; and
(III) suspending the port of a user who fails to present a valid account name after a predetermined number of attempts.

15. A method for verifying the integrity of an authentication and authorization database in a trusted computer system having:

(a) an operating system;

(b) computer system hardware controlled by said operating system;

(c) user software controlled by said operating system;

(d) said user software including a plurality of software processes, each one of said processes functioning separately from the others;

(e) said computer system hardware and said operating system together isolating each one of said processes from the other to prevent any unauthorized operation of any one of said processes from affecting the operation of any other of said processes;

(f) a selected one of said plurality of software processes being designated as a first Authentication Daemon (AD); and (g) a selected one of said plurality of software processes being designated as a second Authentication Daemon (AD).

said method comprising the steps of:

(I) reading each record from said authentication and authorization database;

(II) if said record is an authentication record presenting said record to the correct one of said ADs; and (III) determining in said AD the status of said record.

16. The method according to claim 15 wherein the determining step (III) includes the further step of concluding status of said record as either valid or invalid.

17. The method of claim 16 wherein if the status is valid establishing it as being one of frozen, normal, warning, expired, or extinct.

18. A trusted computer system, said system comprising;

computer hardware;

an authentication and authorization database;

means for providing a plurality of user software processes certain of said processes being daemons each one of said daemons functioning separately from and being isolated from all other processes to prevent unauthorized operation of any one of said certain and said other processes from affecting operation of any of said software daemons; and, means for selecting one of said daemons to control access to said authentication and authorization database whereby all of said processes and their respective daemons other than said selected daemon are prevented from reading from or writing into said database to protect against unauthorized access thereto.

19. Software methodology including an authentication and authorization database for use in a trusted computer system, said methodology comprising:

(I) providing a plurality of user software processes certain of said processes being daemons, each one of said daemons functioning separately from and being isolated from all other software processes to prevent unauthorized operation of any one of said certain and said other processes from affecting operation of any of said software daemons; and, (II) selecting one of said daemons to control access to said authentication and authorization database whereby all of said processes and their respective daemons other than said selected daemon are prevented from reading from or writing into said database to protect against unauthorized access thereto.

20. A trusted computer system comprising:

(a) computer system hardware;

(b) an operating system for controlling said hardware;

(c) an authentication and authorization database stored in said hardware;

(d) user software controlled by said operating system;

(e) said user software including a plurality of software processes, each one of said processes functioning separately from the others;

(f) said computer system hardware including means for isolating each one of said processes from the other to prevent any unauthorized operation of any one of said processes from affecting the operation of any other of said processes; and (g) means for selecting at least one of said plurality of software processes as an Authentication Daemon (AD) each said AD comprising:

(i) means for validating authorization data; and (ii) means for changing authorization data.

21. The computer system of claim 20 further including means to allow a user to modify said authentication and authorization database comprising:

(a) means for accepting new information from said user;

(b) means for sending said new information to the appropriate one of said ADs; and (c) means for verifying said new information in said appropriate AD whereby no other component of said computer system is required to validate said new information.

22. The computer system of claim 20 further including means to allow a user to modify said authentication and authorization database comprising:

(a) means for requesting each of said at least one AD to format the authentication data for said user in a human readable format whereby no other process of said computer system is required to format said authentication data;

(b) means for displaying said authentication data to said user to provide displayed data;

(c) means for allowing said user to select from said displayed data to be modified to provide selected data;

(d) means for accepting new information from said user;

(e) means for sending said new information to the appropriate one of said ADs; and (f) means for verifying said new information in said appropriate AD whereby no other process of said computer system is required to validate said new information.

23. The computer system of claim 20 wherein at least one of said ADs additionally comprises means for creating initial authorization records in said authorization and authentication database when said computer system is installed.

24. The computer system of claim 20 wherein at least one of said ADs additionally comprises means for allowing a system administrator to add authorization records to said authorization and authentication database.

25. The computer system of claim 20 wherein at least one of said ADs additionally comprises means for allowing a system administrator to modify authorization records in said authorization and authentication database.

* * * * *